(12) United States Patent
Yang et al.

(10) Patent No.: US 9,716,448 B2
(45) Date of Patent: Jul. 25, 2017

(54) POWER TOOL AND CONTROL CIRCUIT THEREOF

(71) Applicant: CHERVON (HK) LIMITED, Wanchai (HK)

(72) Inventors: Dezhong Yang, Nanjing (CN); Chao Xian, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 15/261,346

(22) Filed: Sep. 9, 2016

(65) Prior Publication Data
US 2017/0077842 A1    Mar. 16, 2017

(30) Foreign Application Priority Data
Sep. 14, 2015 (CN) .......................... 2015 1 0584010

(51) Int. Cl.
*H02P 1/00* (2006.01)
*H02P 3/00* (2006.01)
*H02P 5/00* (2016.01)
*H02P 3/14* (2006.01)
*H02K 7/14* (2006.01)
*H02J 7/00* (2006.01)
*A01D 34/69* (2006.01)
*A01D 101/00* (2006.01)

(52) U.S. Cl.
CPC ............... *H02P 3/14* (2013.01); *A01D 34/69* (2013.01); *H02J 7/0052* (2013.01); *H02K 7/14* (2013.01); *A01D 2101/00* (2013.01)

(58) Field of Classification Search
CPC ................ H02P 3/14; A01D 3/14; H02K 7/14
USPC ......................................................... 318/139
See application file for complete search history.

(56) References Cited

U.S. PATENT DOCUMENTS

| | | | |
|---|---|---|---|
| 2004/0135373 A1* | 7/2004 | Osborne ............ | A01D 34/6806 290/1 A |
| 2011/0121653 A1* | 5/2011 | Hartular .................... | H02J 1/10 307/66 |
| 2015/0054428 A1* | 2/2015 | Osborne ........... | H01M 10/4264 318/139 |

* cited by examiner

*Primary Examiner* — Erick Glass
(74) *Attorney, Agent, or Firm* — Greenberg Traurig, LLP

(57) ABSTRACT

A power tool and a control circuit thereof by which electric energy can be recovered into a battery pack while an electric motor is braked. The control circuit includes a battery, the electric motor, an operation switch, a first control switch, a second control switch, a controller and an inductive element. The control circuit has a discharging state, a braking state and a charging state. In the charging state, the operation switch is in a second switched-on state, the first control switch is switched on, the second control switch is switched off, the battery, the inductive element, the operation switch, the electric motor and the first control switch form a charging circuit, and the electric motor charges the battery. The controller is electrically connected with the operation switch, the first control switch and the second control switch, respectively.

10 Claims, 2 Drawing Sheets

POWER TOOL AND CONTROL CIRCUIT THEREOF

CROSS REFERENCE

This application claims priority to Chinese Patent Application No. 201510584010.9, entitled "POWER TOOL AND CONTROL CIRCUIT THEREOF", filed with the Chinese Patent Office on Sep. 14, 2015, which is incorporated herein by reference in its entirety.

TECHNICAL FIELD

The present disclosure relates to a power tool and a control circuit thereof.

BACKGROUND

In existing power tools, in order to brake an electric motor quickly, a connecting terminal of the electric motor is often short-circuited when disconnected from a power source, so that the electric motor generates self-induced current due to inertia, and the electric motor is decelerated quickly under an action between a magnetic field generated in coils by the self-induced current and a magnetic field of the electric motor itself. However, great energy loss may be caused in this way.

SUMMARY

One aspect of the present disclosure provides a control circuit including: a battery, an electric motor, an operation switch, a first control switch, a second control switch, a controller and an inductive element, wherein the control circuit has a discharging state, a braking state and a charging state. In the discharging state, the operation switch is in a first switched-on stat, the first control switch is switched on, the battery, the operation switch, the electric motor and the first control switch form a discharging circuit, and the electric motor consumes electric energy of the battery. In the braking state, the operation switch is in a second switched-on state, both the first control switch and the second control switch are switched on, the inductive element, the operation switch, the electric motor, the first control switch and the second control switch form a braking circuit, and the inductive element stores electric energy. In the charging state, the operation switch is in the second switched-on state, the first control switch is switched on, the second control switch is switched off, the battery, the inductive element, the operation switch, the electric motor and the first control switch form a charging circuit, and the inductive element charges the battery. The controller is electrically connected with the operation switch, the first control switch and the second control switch, respectively.

Preferably, in the charging state, current generated by the electric motor flows into the battery after passing through the inductive element.

Preferably, a diode, which allows the current to flow only unidirectionally from the inductive element to an anode of the battery, is provided between the inductive element and the anode of the battery.

Preferably, the controller includes a first driving module for controlling the first control switch to be switched on when the operation switch is in the second switched-on state and a second driving module for controlling the second control switch to be switched on or off with a control signal having a duty cycle when the operation switch is in the second switched-on state.

Preferably, the operation switch is operable to switch between the first switched-on state and the second switched-on state and is maintained in one of the first switched-on state and the second switched-on state, and the controller controls the first control switch and the second control switch according to a change in voltage caused by switching the operation switch.

Another aspect of the present disclosure provides a power tool including a battery, an electric motor, an operation switch, a first control switch, a second control switch, a controller and an inductive element, wherein the power tool has a discharging state, a braking state and a charging state. In the discharging state, the operation switch is in a first switched-on state, the first control switch is switched on, the battery, the operation switch, the electric motor and the first control switch form a discharging circuit, and the electric motor consumes electric energy of the battery. In the braking state, the operation switch is in a second switched-on state, both the first control switch and the second control switch are switched on, the inductive element, the operation switch, the electric motor, the first control switch and the second control switch form a braking circuit, and the inductive element stores electric energy. In the charging state, the operation switch is in a second switched-on state, the first control switch is switched on, the second control switch is switched off, the battery, the inductive element, the operation switch, the electric motor and the first control switch form a charging circuit, and the inductive element charges the battery. The controller is electrically connected with the operation switch, the first control switch and the second control switch, respectively.

Preferably, in the charging state, current generated by the electric motor flows into the battery after passing through the inductive element.

Preferably, a diode, which allows the current to flow only unidirectionally from the inductive element to an anode of the battery, is provided between the inductive element and the anode of the battery.

Preferably, the controller includes a first driving module for controlling the first control switch to be switched on when the operation switch is in the second switched-on state and a second driving module for controlling the second control switch to be switched on or off with a control signal having a duty cycle when the operation switch is in the second switched-on state.

Preferably, the power tool is a lawnmower, and the electric motor is used in a self-propelled system of the lawnmower. The lawnmower includes traveling wheels, and the traveling wheels are driven by the electric motor.

An advantage of the present disclosure is that part of electric energy can be recovered into a battery pack while the electric motor is braked.

DETAILED DESCRIPTION

The present disclosure will be described in detail in conjunction with accompanying drawings and specific embodiments hereinafter.

Figure 1:
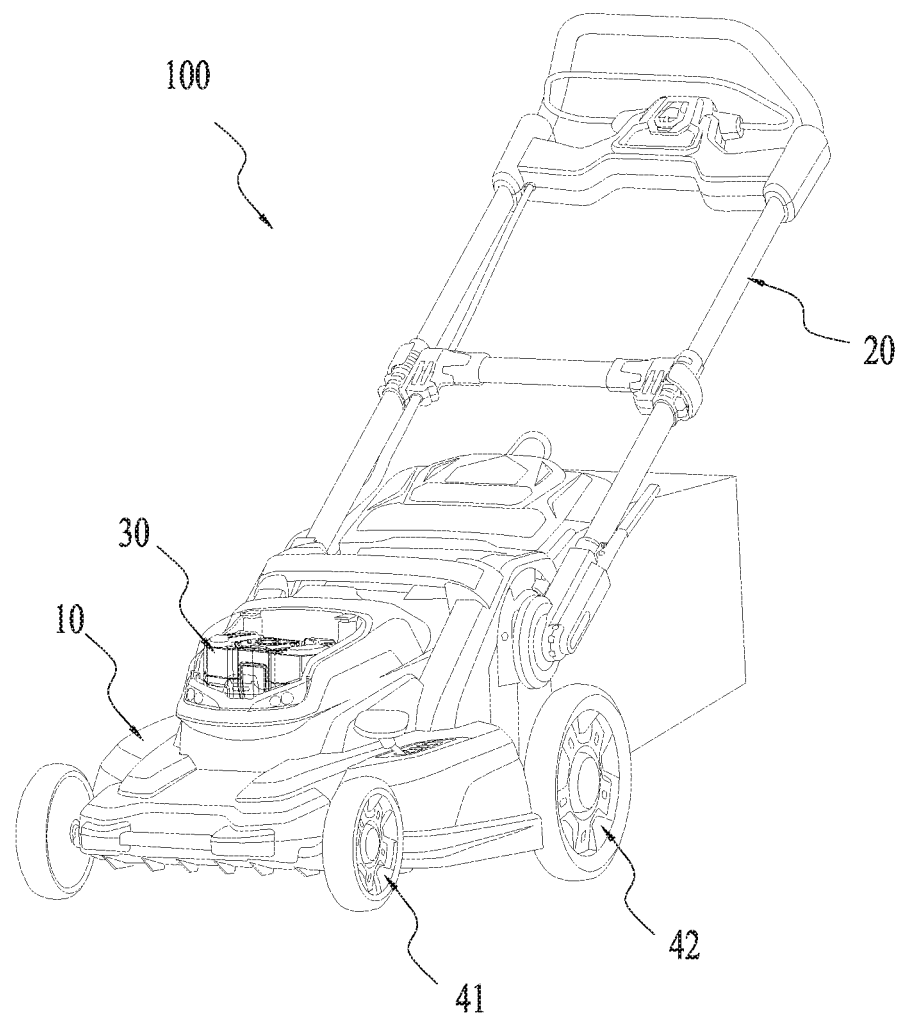
FIG. 1 shows an exemplary form of a power tool.

A power tool 100 shown in FIG. 1 includes a main machine 10, an operation handle 20 and a battery pack 30. In the illustrated embodiment, the power tool 100 is a lawnmower. The power tool 100 may also be other power tools such as a drill, a circular saw and an angle grinder.

The main machine 10 is used for implementing functions of a tool, a cutting device and an electric motor are arranged in the main machine, and the electric motor drives the cutting device to cut. The battery pack 30 is used for supplying power to the main machine 10. The operation handle 20 is provided for a user to operate the power tool 100.

In addition, as shown in FIG. 1, the power tool 100 includes traveling wheels 41 and 42. The power tool 100 has a self-propelled function, which may be implemented by an electric motor driving the traveling wheels 41 and 42 to rotate. It should be noted that, the electric motor for driving the traveling wheels 41 and 42 and the electric motor for driving the cutting device may be the same electric motor, or may be different electric motors.

In operation, whether the power tool 100 is performing the self-propelled function or the cutting function, when the user needs to stop, it is necessary to stop rotation of the electric motor quickly to ensure security, so that the electric motor is braked. However, existing braking solutions often cause loss of electric energy.

Figure 2:
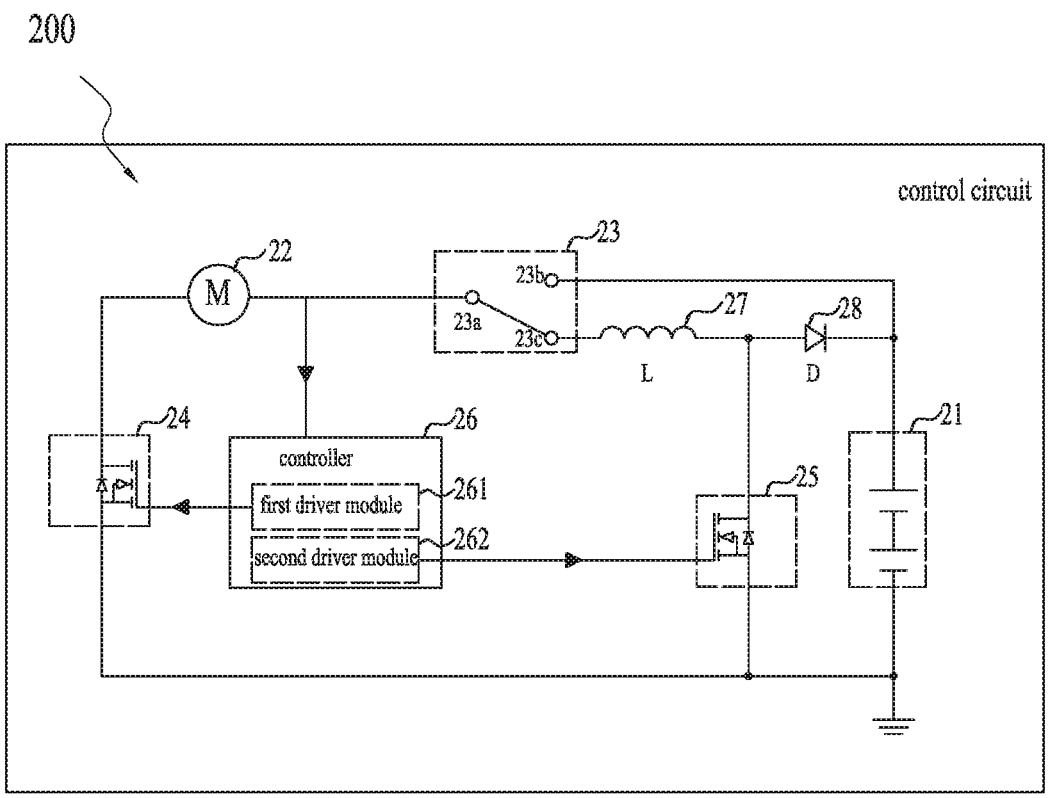
FIG. 2 is a diagram of a control circuit of the power tool shown in FIG. 1.

The power tool 100 may employ a control circuit 200 shown in FIG. 2, and the control circuit 200 includes a battery 21, an electric motor 22, an operation switch 23, a first control switch 24, a second control switch 25, a controller 26 and an inductive element 27.

The operation switch 23 has two switched-on states, that is, the operation switch 23 has one stationary contact 23a and two movable contacts 23b and 23c. When the user operates the operation switch 23, the stationary contact 23a is caused to be connected with one of the movable contacts 23b and 23c.

As shown in FIG. 2, when the stationary contact 23a is connected with the movable contact 23b, it is defined as a first switched-on state of the operation switch 23, and the battery 21, the electric motor 22 and the first control switch 24 are connected in series in the circuit formed. It should be noted that the first control switch 24 is connected in series in the circuit through a switch thereof, and a control terminal thereof is connected with the controller.

At this time, as long as a switch terminal of the first control switch 24 is switched on under control of the controller, the battery 21 in the circuit may power the electric motor 22 to rotate.

As shown in FIG. 2, when the stationary contact 23a is connected with the movable contact 23c, it is defined as a second switched-on state of the operation switch 23, and the inductive element 27, a diode 28, the battery 21, the first control switch 24 and the electric motor 22 are connected in series in a circuit formed. In addition, a switch terminal of the first control switch 24 is connected with an anode of the diode 28 and a cathode of the battery 21, respectively, and the control terminal thereof is also connected with the controller.

At this time, if the switch terminals of the first control switch 24 and the second control switch 25 are switched on under control of the controller, a circuit is conducted by the second control switch 25 results in the battery 21 being short-circuited. However, since no current is generated between the anode and cathode of the battery 21 due to existence of the diode 28, for the electric motor 22, a circuit formed by the first control switch 24, the second control switch 25 and the inductive element 27 results in the electric motor 22 being short-circuited, and in such case, the electric motor 22 may be braked due to current generated by an induced electromotive force.

Further, if the switch terminal of the second control switch 25 is switched off at this time, induced current generated by the electric motor 22 may charge the battery 21.

A semiconductor element having a switch terminal and a control terminal, for example, a MOSFET, etc. may be used as the first control switch 24 or the second control switch 25, and in this way, the controller may implement braking and recovering energy simultaneously in a manner of controlling duty cycles of the first control switch 24 and the second control switch 25 when the stationary contact 23a is connected with the movable contact 23c.

It can be known from the above description that, the control circuit 200 has a discharging state, a braking state and a charging state. In the discharging state, the operation switch 23 is in a first switched-on state, the first control switch 24 is switched on, the battery 21, the operation switch 23, the electric motor 22 and the first control switch 24 form a discharging circuit, and the electric motor 22 consumes electric energy of the battery 21.

In the braking state, the operation switch 23 is in a second switched-on state, both the first control switch 24 and the second control switch 25 are switched on, the inductive element 27, the operation switch 23, the electric motor 22, the first control switch 24 and the second control switch 25 form a braking circuit, and the electric motor 22 is in a discharging state.

In the charging state, the operation switch 23 is in the second switched-on state, the first control switch 24 is switched on, the second control switch 25 is switched off, the battery 21, the inductive element 27, the operation switch 23, the electric motor 22 and the first control switch 24 form a charging circuit, and the electric motor 22 charges the battery 21. The controller is electrically connected with the operation switch 23, the first control switch 24 and the second control switch 25, respectively.

In the charging state, the battery 21 is charged by the electric motor 22 and the inductive element 27 with superimposition of an induced electromotive force of the electric motor 22 and an electromotive force of the inductive element 27 generated due to storage of electric energy. A diode 28 which allows the current to flow only unidirectionally from the inductive element 27 to an anode of the battery 21 is provided between the inductive element 27 and the anode of the battery 21.

Also, as shown in FIG. 2, the controller 26 includes a first driving module 261 for controlling the first control switch 24 to be switched on when the operation switch 23 is in a second switched-on state and a second driving module 262 for controlling the second control switch 25 to be switched on or off with a control signal having a duty cycle when the operation switch 23 is in a second switched-on state.

Further, as shown in FIG. 2, the operation switch, when operated by a user, can switch between the first switched-on state and the second switched-on state and is maintained in one of the first switched-on state and the second switched-on state, and the controller controls the first control switch 24 and the second control switch 25 according to a change in voltage caused by switching the operation switch 23. The duty cycle of the first control switch 24 is greater than the duty cycle of the second control switch 25.

The electric motor controlled by the control circuit 200 described above may be an electric motor in charge of the self-propelled function in the power tool 100.

Basic principles, main features and advantages of the present disclosure are shown and described in the above. Those skilled in the art should understand that, the present disclosure is not limited by any form of the embodiments described above, and any technical solution obtained in a manner of equal replacement or equivalent variation should fall into the scope of the present disclosure.

What is claimed is:

1. A control circuit of a power tool, comprising:
a battery;
an electric motor;
an operation switch;
a first control switch;
a second control switch;
a controller; and
an inductive element;
wherein the control circuit has a discharging state, a braking state and a charging state;
wherein, in the discharging state, the operation switch is in a first switched-on state, the first control switch is switched on, the battery, the operation switch, the electric motor and the first control switch form a discharging circuit, and the electric motor consumes electric energy of the battery;
wherein, in the braking state, the operation switch is in a second switched-on state, both the first control switch and the second control switch are switched on, the inductive element, the operation switch, the electric motor, the first control switch and the second control switch form a braking circuit, and the inductive element stores electric energy;
wherein, in the charging state, the operation switch is in the second switched-on state, the first control switch is switched on, the second control switch is switched off, the battery, the inductive element, the operation switch, the electric motor and the first control switch form a charging circuit, and the inductive element charges the battery; and
wherein the controller is electrically connected with the operation switch, the first control switch and the second control switch, respectively.

2. The control circuit according to claim 1, wherein, in the charging state, current generated by the electric motor flows into the battery after passing through the inductive element.

3. The control circuit according to claim 2, wherein a diode, which allows the current to flow only unidirectionally from the inductive element to an anode of the battery, is provided between the inductive element and the anode of the battery.

4. The control circuit according to claim 1, wherein the controller comprises a first driving module for controlling the first control switch to be switched on when the operation switch is in the second switched-on state and a second driving module for controlling the second control switch to be switched on or off with a control signal having a duty cycle when the operation switch is in the second switched-on state.

5. The control circuit according to claim 1, wherein the operation switch is operable to switch between the first switched-on state and the second switched-on state and is maintained in one of the first switched-on state and the second switched-on state and the controller controls the first control switch and the second control switch according to a change in voltage caused by switching the operation switch.

6. A power tool, comprising:
a battery;
an electric motor;
an operation switch;
a first control switch;
a second control switch;
a controller; and
an inductive element;
wherein the power tool has a discharging state, a braking state and a charging state;
wherein, in the discharging state, the operation switch is in a first switched-on state, the first control switch is switched on, the battery, the operation switch, the electric motor and the first control switch form a discharging circuit, and the electric motor consumes electric energy of the battery;
wherein, in the braking state, the operation switch is in a second switched-on state, both the first control switch and the second control switch are switched on, the inductive element, the operation switch, the electric motor, the first control switch and the second control switch form a braking circuit, and the inductive element stores electric energy;
wherein, in the charging state, the operation switch is in the second switched-on state, the first control switch is switched on, the second control switch is switched off, the battery, the inductive element, the operation switch, the electric motor and the first control switch form a charging circuit, and the inductive element charges the battery; and
wherein the controller is electrically connected with the operation switch, the first control switch and the second control switch, respectively.

7. The power tool according to claim 6, wherein, in the charging state, current generated by the electric motor flows into the battery after passing through the inductive element.

8. The power tool according to claim 7, wherein a diode, which allows the current to flow only unidirectionally from the inductive element to an anode of the battery, is provided between the inductive element and the anode of the battery.

9. The power tool according to claim 6, wherein the controller includes a first driving module for controlling the first control switch to be switched on when the operation switch is in the second switched-on state and a second driving module for controlling the second control switch to be switched on or off with a control signal having a duty cycle when the operation switch is in the second switched-on state.

10. The power tool according to claim 6, wherein the power tool is a lawnmower having traveling wheels and the traveling wheels are driven by the electric motor.

* * * * *